(12) United States Patent
Gupta et al.

(10) Patent No.: US 9,556,853 B2
(45) Date of Patent: Jan. 31, 2017

(54) METHOD OF OPERATING A WIND TURBINE PLANT

(71) Applicant: VESTAS WIND SYSTEMS A/S, Aarhus N (DK)

(72) Inventors: Manoj Gupta, Singapore (SG); Dilip Kumar Guru, Singapore (SG); Amit Kumar Gupta, Singapore (SG)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 14/765,938

(22) PCT Filed: Feb. 15, 2013

(86) PCT No.: PCT/DK2013/050039
§ 371 (c)(1),
(2) Date: Aug. 5, 2015

(87) PCT Pub. No.: WO2014/124644
PCT Pub. Date: Aug. 21, 2014

(65) Prior Publication Data
US 2015/0369217 A1    Dec. 24, 2015

(51) Int. Cl.
*F03D 9/00* (2016.01)
*H02H 3/00* (2006.01)
(Continued)

(52) U.S. Cl.
CPC ............ *F03D 9/005* (2013.01); *F03D 7/0272* (2013.01); *G05B 23/0235* (2013.01);
(Continued)

(58) Field of Classification Search
CPC .......... H02H 3/006; H02H 3/025; H02H 3/08; H02H 7/093; H02J 1/00; H02J 3/381; H02J 3/382; H02J 3/386; H01H 71/10; H01H 81/00; G05B 23/0235; G06F 2217/78; Y02E 10/563
See application file for complete search history.

(56) References Cited

U.S. PATENT DOCUMENTS 7,447,568 B2 * 11/2008 Christensen ........... H02H 3/025
361/18
7,800,877 B2 * 9/2010 Zeuch .................... H02H 3/025
361/92

(Continued)

FOREIGN PATENT DOCUMENTS

DE    102009038209 A1 *  2/2010    ............. H02H 3/023
EP    2481915 A1    8/2012

OTHER PUBLICATIONS

International Search Report for PCT/DK2013/050039, Jan. 2, 2014.

*Primary Examiner* — Crystal J Barnes-Bullock
(74) *Attorney, Agent, or Firm* — Patterson + Sheridan, LLP

(57) ABSTRACT

A method of operating a wind turbine plant is provided. Such a wind turbine plant comprises at least one transmission branch comprising a plurality of wind turbine generators and coupled to an electrical grid at a point of common coupling through at least one circuit breaker comprising a breaking capacity. The method comprises monitoring the electrical grid for a low voltage fault event; and if a low voltage fault event is detected: calculating a grid short circuit strength, determining a short circuit current limit if the grid short circuit strength requires an initial fault current contribution which exceeds the breaking capacity of the circuit breaker to be passed through the circuit breaker, determining a maximum fault current contribution based on the short circuit current limit and operating the wind turbine generators to provide to the electrical grid the maximum fault current contribution.

15 Claims, 3 Drawing Sheets

(51) Int. Cl.
*H02H 7/093* (2006.01)
*H02H 3/02* (2006.01)
*H02J 3/38* (2006.01)
*H02H 3/08* (2006.01)
*H01H 71/10* (2006.01)
*G05B 23/02* (2006.01)
*H01H 81/00* (2006.01)
*H02J 3/16* (2006.01)
*F03D 7/02* (2006.01)
*H02J 3/18* (2006.01)
*H02P 9/00* (2006.01)
*H02H 7/30* (2006.01)

(52) U.S. Cl.
CPC ............ *H01H 71/10* (2013.01); *H01H 81/00* (2013.01); *H02H 3/006* (2013.01); *H02H 3/025* (2013.01); *H02H 3/08* (2013.01); *H02H 7/093* (2013.01); *H02J 3/16* (2013.01); *H02J 3/18* (2013.01); *H02J 3/38* (2013.01); *H02J 3/381* (2013.01); *H02J 3/382* (2013.01); *H02J 3/386* (2013.01); *H02P 9/006* (2013.01); *H02H 7/30* (2013.01); *Y02E 10/563* (2013.01); *Y02E 10/763* (2013.01); *Y02E 40/34* (2013.01)

(56) References Cited

U.S. PATENT DOCUMENTS

| | | | |
|---|---|---|---|
| 8,131,401 B2* | 3/2012 | Nasle | G05B 23/0235 700/286 |
| 9,325,173 B2* | 4/2016 | Varma | H02J 3/01 |
| 2011/0043186 A1 | 2/2011 | Bech et al. | |
| 2011/0282507 A1* | 11/2011 | Oudalov | H04B 3/54 700/292 |
| 2012/0191440 A1* | 7/2012 | Meagher | H02J 3/38 703/18 |
| 2012/0248772 A1 | 10/2012 | Shigemizu et al. | |
| 2013/0015660 A1 | 1/2013 | Hesselbæk et al. | |
| 2014/0306533 A1* | 10/2014 | Paquin | H02J 3/383 307/52 |
| 2015/0236497 A1* | 8/2015 | Gentsch | H02H 3/025 361/93.9 |

* cited by examiner

METHOD OF OPERATING A WIND TURBINE PLANT

CROSS-REFERENCE TO RELATED APPLICATIONS

This application is the national phase under 35 U.S.C. sctn. 371 of PCT International Application No. PCT/DK2013/050039 which has an International filing date of Feb. 15, 2013, which designated the United States of America, the entire contents of which are hereby incorporated herein by reference.

FIELD OF THE INVENTION

The present invention generally relates to a method of operating a wind turbine plant, in particular operating a wind turbine plant during a low voltage fault situation, in particular a short circuit fault.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbines may be arranged together to form a wind park or wind power plant.

Wind power plants are coupled to an electrical network or grid which distributes electrical power by means of circuit breakers. As wind power plants are generally situated in rural areas, infrastructure is generally inadequately set up to support the wind power plant electrical distribution. As a result, such electrical grids which are far from the main generation units experience a phenomena known as "weak grid".

In large wind power plants connected to a weak grid, large fault current contributions are required to maintain system stability. However, the present assignees of the application have discovered that during conditions when the grid short circuit strength increases, the fault current contribution could exceed the breaking capacity of the circuit breaker. This issue is exacerbated in situations when additional power production units, for example more wind turbines, or gas turbines or coal plants, are added onto the transmission circuit of a wind power plant, and in situations of a fault, append their fault contribution onto the transmission circuit of the wind power plant. This leads to further stress on the circuit breaker, which may permanently damage when undertaking a disconnection by opening a circuit which has been loaded with current that exceeds its rating.

The present invention seeks to provide a solution to address the above situation.

SUMMARY OF THE INVENTION

In an aspect of the invention, there is provided a method of operating a wind turbine plant comprising at least one transmission branch comprising a plurality of wind turbine generators, the transmission branch coupled to an electrical grid at a point of common coupling through at least one circuit breaker comprising a breaking capacity, the method comprising monitoring the electrical grid for a low voltage fault event; and if a low voltage fault event is detected: calculating a grid short circuit strength, determining a short circuit current limit if the grid short circuit strength requires an initial fault current contribution which exceeds the breaking capacity of the circuit breaker to be passed through the circuit breaker, determining a maximum fault current contribution based on the short circuit current limit and operating the wind turbine generators to provide to the electrical grid the maximum fault current contribution.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

Figure 1:
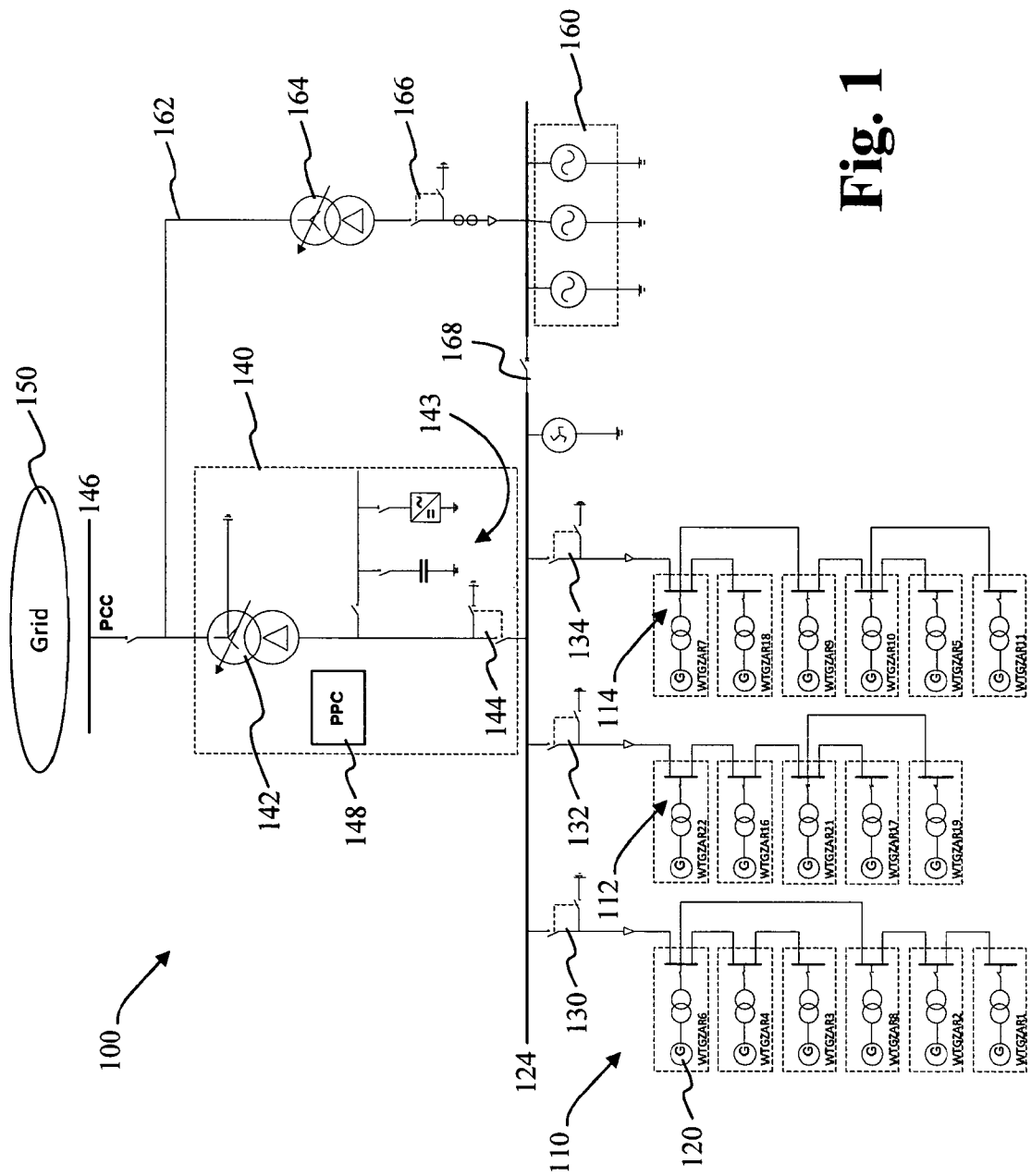
FIG. 1 illustrates a layout of wind turbine plant according to an embodiment.

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In an aspect of the invention, there is provided a method of operating a wind turbine plant comprising at least one transmission branch comprising a plurality of wind turbine generators, the transmission branch coupled to an electrical grid at a point of common coupling through at least one circuit breaker comprising a breaking capacity, the method comprising monitoring the electrical grid for a low voltage fault event; and if a low voltage fault event is detected: calculating a grid short circuit strength, determining a short circuit current limit if the grid short circuit strength requires an initial fault current contribution which exceeds the breaking capacity of the circuit breaker to be passed through the circuit breaker, determining a maximum fault current contribution based on the short circuit current limit and operating the wind turbine generators to provide to the electrical grid the maximum fault current contribution.

In operating the wind turbine plant, the typical requirement placed on wind turbine plants by grid codes incorporated by geographical transmission operators is the wind turbines to stay connected to the transmission grid and to provide as much reactive current as possible during low voltage fault events. The provision of the reactive current is required in supporting the transmission grid in recovering the grid voltage to its nominal value. Briefly, the more reactive current that is provided to the grid, the quicker it takes for the grid voltage to recover. Previous wind turbine plant systems have acceded to such grid requirements by setting their low voltage fault response to provide as much reactive current as the generating systems are able to.

Typically, circuit breakers, like other physical hardware switches are designed with a buffer to their operational capacity in order to accommodate most voltage fluctuations. However, as mentioned above, the present assignees have discovered situations where typical operational design does not suitably cover the extreme fault situations. Instead of replacements of installed solutions, or putting in circuit breakers with higher capacity ratings in designing new plants, which are both costly and impractical, a solution based on the control of operational output of the wind turbine plant is proposed. Such a solution is cost-effective and eliminates the need of costly hardware solutions, while at the same time, only minimally reduces the rate at which the transmission grid might recover from the low voltage fault event.

In the present invention, the grid short circuit strength is calculated, and a consideration made if the fault current contribution based on the grid short circuit strength requires an abnormally high reactive current support. A better understanding of the grid support requirement is made in taking into account the grid strength. This in turn leads to a more accurate modification of any changes to the power supplied to the grid.

Presently, by operating the wind turbine plant, and specifically the wind turbine generators, to provide a maximum fault current contribution based on a short circuit current limit during a low voltage fault event, the risk of the plant having a fault contribution which exceeds the breaking capacity of a circuit breaker in the plant is reduced. By incorporating the consideration of the installed circuit breaker capacity into the control scheme, there can be provided an accurate representation of how much current needs to be reduced, while still providing as much reactive current as possible to facilitate the recovery of the transmission grid. An advantage of such a method is that the plant designer and owner are able to plan for the use of circuit breakers with a lower rating, as well open up plant siting opportunities which may have been excluded in view of weak grid issues.

In an embodiment, the method further comprises determining a corresponding maximum fault current contribution for each wind turbine generator, based on the short circuit current limit and an output capability of each wind turbine generator. In doing so, there is provided a finer control with regard to the fault injection support of the plant. This allows the different turbines in the plant to be optimized for fault support and the plant to provide as much fault injection support without compromising the health of the installed equipment.

In an embodiment, calculating a grid short circuit strength comprises injecting a predetermined amount of reactive power into the electrical grid at a defined location within the wind turbine plant, measuring a change in a voltage level of the grid, and determining a grid short circuit strength by comparing the change in the voltage level of the grid with the amount of injected reactive power.

In an embodiment, the short circuit current limit is determined to be the breaking capacity of the circuit breaker. This allows the plant power controller to modify the fault current injection while keeping track of the breaking capacity of the circuit breaker in concern. In situations where multiple circuit breakers are present in the wind turbine plant, and the grid short circuit strength requires an initial fault current contribution which exceeds the breaking capacity if more than one circuit breaker, the circuit breaker with the lowest breaking capacity will be taken in consideration for determining the short circuit current limit.

In another embodiment, determining the maximum fault current contribution comprises implementing the use of a weak grid injection profile in place of a conventional fault injection profile. The implementation of a weak grid injection profile allows the wind turbine converter controllers to immediately switch over to a maximum fault current contribution which is lower than what is required by a conventional fault injection profile.

In a further embodiment, the weak grid fault injection profile is obtained by determining the maximum fault current contribution based on the grid short circuit strength, the present grid voltage and the breaking capacities of the circuit breakers in the plant, and lowering the reactive current injection gain in the injection profile, such that the output of the wind turbine plant matches the maximum fault current contribution. Pre-determining the maximum fault current injection, and implementing it onto a weak grid fault injection profile, is advantageous in terms of computing and communication time saved in comparison to determining after the fault is detected.

In an embodiment, determining the maximum fault current contribution comprises iteratively lowering a power reference to be provided to the wind turbine generators such that the amount of fault current to be produced by the wind turbine generators drops below the short circuit current limit.

Iteratively lowering the power reference allows the plant power controller to step through proper calculations to determine the maximum fault current contribution, and also allows the plant power controller to have a view on any further issues which might occur in running the plant with such a determined fault contribution.

In another embodiment, the low voltage fault event is any one of an electrical grid short circuit, an electrical grid fault, and a plant transmission circuit short circuit fault. Such events typically cause a drastic increase in the amount of current being transmitted due to the sharp drop in electrical resistance, and monitoring the plant allows the plant power controller to identify and react to these events.

In an embodiment, determining the corresponding maximum fault current contribution further comprises analyzing an operational status of the wind turbine generator. In a further embodiment, determining the corresponding maximum fault current contribution further comprises analyzing an operational status of a power converter in the wind turbine generator. Operational status such as the condition of the power converter, the number of parallel converter modules operational, the operating conditions of the generator windings and insulation, amongst others, are monitored and considered. This allows the plant power controller to optimally operate the individual wind turbines.

In another aspect of the invention, there is provided a wind turbine plant comprising at least one transmission branch comprising a plurality of wind turbine generators, the transmission branch coupled to an electrical grid at a point of common coupling through at least one circuit breaker comprising a breaking capacity; and a wind turbine plant power control system comprising: a monitoring circuit configured to detect a low voltage fault event, a short circuit strength calculation unit configured to calculate a gird short circuit strength, a determination unit configured to determine a short circuit current limit if the grid short circuit strength requires an initial fault current contribution which exceeds the breaking capacity of the circuit breaker to be passed through the circuit breaker, a fault current determination unit configured to determine a maximum fault current contribution based on the short circuit current limit, and a power controller configured to send reference signals to the wind turbine generators to provide to the electrical grid the maximum fault current contribution.

In an embodiment, the determination unit is configured to determine a corresponding maximum fault current contribution for each wind turbine generator, based on the short circuit current limit and an output capability of each wind turbine generator.

In another embodiment, the fault current determination unit comprises a weak grid fault injection profile for use in place of a conventional fault injection profile. In yet another embodiment, the plant further comprises a fault injection profile determination unit configured to determine the maximum fault current contribution based on the grid short circuit strength, the present grid voltage and the breaking capacities of the circuit breakers in the plant, and lowering the reactive current injection gain in the injection profile, such that the output of the wind turbine plant matches the maximum fault current contribution.

In an embodiment, the weak grid fault injection profile is provided to and stored in a wind turbine power converter control unit for operating the wind turbine generator.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

FIG. 1 illustrates a wind turbine plant layout according to an embodiment. In the embodiment, wind turbine plant 100 comprises a plurality of transmission branches 110, 112, 114. each comprising a plurality of wind turbine generators 120 electrically connected to the transmission branch. In the present embodiment, the wind turbine plant 100 comprises a fleet of similar wind turbine generators 120. However, in other embodiments, it is common to have a variety of wind turbine generators connected to the transmission branches in the wind turbine plant. A reason for this is that the wind turbine generators are geographically distributed at various locations where the prevailing winds would be better utilized by different types of wind turbines generators.

In the present embodiment, each wind turbine generator 120 is provided as a 3MW turbine. Each turbine 120 comprises a plurality of rotor blades driving a rotating main shaft which is mechanically coupled to a gearbox which steps up the rotation for a high-speed generator shaft. A permanent magnet generator is provided and mechanical torque is converted into electrical power, which is provided to a full-scale power converter for power conditioning. The output of the power converter is stepped up with a transformer provided in the turbine, which thereafter produces electrical power rated at 30 kV to the transmission branches 110, 112, 114. In other embodiments, the turbines in the plant comprise a generator which may be a singly or doubly-fed synchronous generator, an induction generator or any other type of generator comprising a stator winding. Further, turbines in other embodiments may comprise direct drive or other alternative drive systems, which eliminate the use of a traditional gearbox.

Each transmission branch 110, 112, 114 is coupled to a plant distribution line 124, which may also be known as a main bus bar, by a transmission branch circuit breaker 130, 132, 134. During the installation of the wind turbine plant 100, thorough electrical system analysis is performed, with the assistance of simulation tools such as PowerFactory©, which plans out the infrastructure capability required to operate the wind turbine plant 100. During such analysis, the ratings of the transmission branch circuit breakers 130, 132, 134 are determined, which typically relate to the maximum amount of power which the turbines connected to each branch provides, and maximum fault current rating such as "break and make" ratings.

The function of the transmission branch circuit breaker is to protect both the wind turbines connected to the transmission branch and the other portions of the wind turbine plant from power surges or spikes which might take place when there is a fault in the grid or in the plant. In such an instance, the circuit breaker trips into an open circuit condition, and isolates the transmission branch from the wind turbine plant, until the fault is identified and addressed, and the electrical system is back in order for the reconnection of the transmission branch. In the present embodiment, circuit breakers 144 is rated at 25 kA, and circuit breakers 130, 132 and 134 are rated at 20 kA, which sufficiently caters to the requirement as according to the electrical layout of the wind turbine plant 100.

On the opposing side of the plant distribution line 124 is provided a plant substation 140. Plant substations can either be a physical area of the wind turbine plant or an aggregated number of features spread over the plant. Here, the substation 140 is presented as being located in one physical area. The main components of the substation are the main transformer 142, which steps up generated power in the plant to an appropriate voltage to be provided to an electrical grid 150, and the main switchgear 144, which defines an active switch for the wind turbine plant. The plant substation 140 sits in between the transmission branches 130, 132, 134 of the wind turbine plant 100 and the point of common coupling 146 to the electrical grid 150.

Further, some power compensation equipment 143 is located together with the plant substation 140. The power compensation equipment 143 in the present embodiment comprises STATCOMS, but other alternatives could also be possible, such as: switched capacitor banks, switched inductor banks, static condensers, and synchronous condensers. The power compensation equipment 143 is used to control the power factor, the level of reactive power contributed, or the voltage level of the point of common coupling ("PCC") 146. In other embodiments, the power compensation equipment could be distributed to each wind turbine generator 120.

Operation of the wind turbine plant 100 is controlled by a plant power controller 148 that dispatches various reference set points to individual wind turbine generators 120 in the wind turbine plant 100. The plant power controller 148 also receives multiple sources of measurements from each wind turbine generator 120, as well as from various locations on the transmission branches 110, 112, 114, the distribution line 124, the plant substation 140, and the electrical grid 150, and uses the information received to optimize the wind turbine plant fault current contribution to the electrical grid.

In the present embodiment, wind turbine plant 100 has been appended with an additional set of power generating sources 160. This scenario sometimes takes place when a plant developer decides that in maximizing the geographical land space, additional sources of power generation could be introduced, and with the wind turbine transmission layout probably being the only available electrical infrastructure, and sometimes piggybacks the additional sources onto it.

In the embodiment, the additional sources 160 are typically kept on a separate transmission line 162 with a dedicated step-up transformer 164 and isolation switch 166. The transmission line 162 couples onto the wind turbine plant network at the point of common coupling 146. In the event of a malfunction anywhere on the transmission line 162, the additional sources 160 can be switched over onto the plant distribution line 124 by opening the isolation switch 166 and closing a source switch 168. In such an instance, the plant substation 140 supports the stepping up of the power supplied by the additional sources 160 and the supply of the power to the electrical grid 150.

In allowing the appending of the additional sources 160, the plant developer has planned and run simulations to ensure that the plant infrastructure, and in particular, the main switchgear 144, can support the electrical power provided by the additional sources 160 in normal operating circumstances. In the present embodiment, additional sources 160 are gas turbines coupled to synchronous generators, but any other power generation sources, such as biodiesel, solar or hydroelectric, could be added.

In a scenario, a fault is applied to the wind turbine plant layout of FIG. 1. In this scenario, the additional sources 160 are connected to the wind turbine plant 100 and transmitting, together with the plurality of wind turbine generators 120, through the plant substation 140. The isolation switch 166 is open while source switch 168 is closed to facilitate the transfer of source onto the wind turbine plant transmission circuit. The fault occurring is an electrical grid 150 short circuit fault.

Upon such a fault occurring, the immediate response of the power plant controller 148 is to enter the wind turbine plant 100 into a low voltage ride through mode.

During low voltage ride through, the active power reference for each wind turbine 120 is dropped to zero, and all available capacity of the wind turbine is directed to produce reactive current in order to support the grid voltage. A similar undertaking is carried out by the power controller supervising the additional sources 160 to switch production to facilitate reactive current contribution.

As mentioned, wind turbine plants are often geographically isolated and may be connected to a weak grid. This is so in the present embodiment. In weak grids, large fault current contributions are required to maintain system stability. Theoretically, the larger the amount of reactive power contributed to the electrical system, the quicker the recovery, and the capacity of active power reception is improved. However, as the grid short circuit strength increases due to additional power generation sources being coupled on, the required amount of fault contribution increases.

In such a situation, the increase in reactive power contributed poses a risk of exceeding the breaking capacity of the existing circuit breakers in the plant. In the present embodiment, it is proposed to calculate the grid short circuit strength and determine a short circuit current limit based on the grid short circuit strength. A maximum fault current contribution is provided thereafter by operating the wind turbine generators 120 in the wind turbine plant 100.

The grid short circuit strength, or short circuit ratio ("SCR") of the electrical grid 150 can be measured as the change in grid voltage level at the PCC 146 (dV) as a function of the change in output active power (dP) or reactive power (dQ) of the entire wind power plant. In the present embodiment, it is proposed to inject a predetermined amount of reactive power (dQ) in order to assess the response of the grid voltage level change.

Once the SCR is identified, it is possible to also derive the amount of fault current which is required by the grid. This can be provided by the equation:

$$P_{fault} = SCR \times P_{active}$$

where $P_{fault}$ is the short circuit fault current required and $P_{active}$ is the active power installed. From there, the plant power controller 148 derives the required fault current:

$$I_{fault} = \frac{P_{fault}}{V\sqrt{3}}$$

The identified fault current is a measure of what the electrical grid ideally requires the wind power plant 100 to provide. In order to prevent the occurrence of overcapacity at the circuit breakers in the wind turbine plant 100, the plant power controller compares the identified fault current to the rated capacity of the circuit breakers 130, 132, 134 and the switchgear 144. If the required fault current exceeds the rated breaking capacity of any of the breakers, the plant power controller initiates a determination of a short circuit current limit which is established as the rated capacity of the affected breaker.

In the present embodiment, a difference is then identified between the identified fault current and the short circuit current limit, and established as the amount of fault current to be reduced. It is assumed that the plant power controller 148 does not have control over the additional sources 160. As such, the only power generating sources that the controller 148 can affect are the wind turbine generators 120. The wind turbine generators provide a reactive power current linearly with respect to the per-unit power required. In requiring a reduction of the fault current contribution, the plant power controller 148 linearly scales down to obtain a reduced per-unit power reference to be provided to the wind turbine generators 120, such that the overall output of the wind turbine generators does not exceed the short circuit current limit. The output of the wind turbine generator 120, in response to the provided reduced power reference, is referred to as the maximum fault current contribution.

The present embodiment relates the invention as applied to a wind turbine plant 100 which is coupled with additional power sources 160. It is also applicable to standalone wind turbine plants. It is noted that situations where a wind power plant is coupled to a weak grid, large fault current contributions are required to maintain system stability during a low voltage event. If the low voltage event is caused by a short circuit within the wind power plant, for example a short on a transmission branch of the wind turbine plant which supports a plurality of wind turbines, by virtue of the drop in electrical impedance, all the current in the electrical circuit is drawn to the short circuit.

Further, the power producing sources, such as the wind turbines, switch to a fault ride through mode and start producing as much reactive current as they are able to.

The sharp reduction of the impedance due to a fault will result in fault contribution from all generators as well as having the sources provide the maximum reactive current output, leads to a resultant current spike in the transmission branch which would trip an overcurrent relay on the transmission branch. This leads to a control signal being sent to the transmission branch circuit breaker to open the circuit, so as to protect the electrical equipment on the transmission branch. However, should the current across the transmission branch exceed the breaking capacity of the circuit breaker, to open the breaker over the large current flow typically causes permanent damage to the circuit breaker. And replacement is costly and time consuming. Considering the cost of replacement and cost of the lost production this invention gives a smart solution such that during the fault event in the grid the WPP remain connected and contribute the fault current in control manner so that circuit breaker ratings are not exceeded.

The method according to the invention is able to handle such a scenario, by regulating a maximum fault current contribution from the power producing turbines, not only in the transmission branch at which the short circuit occurs, but on other transmission branches as well, as all current flows toward the short circuit during the fault.

Figure 2:
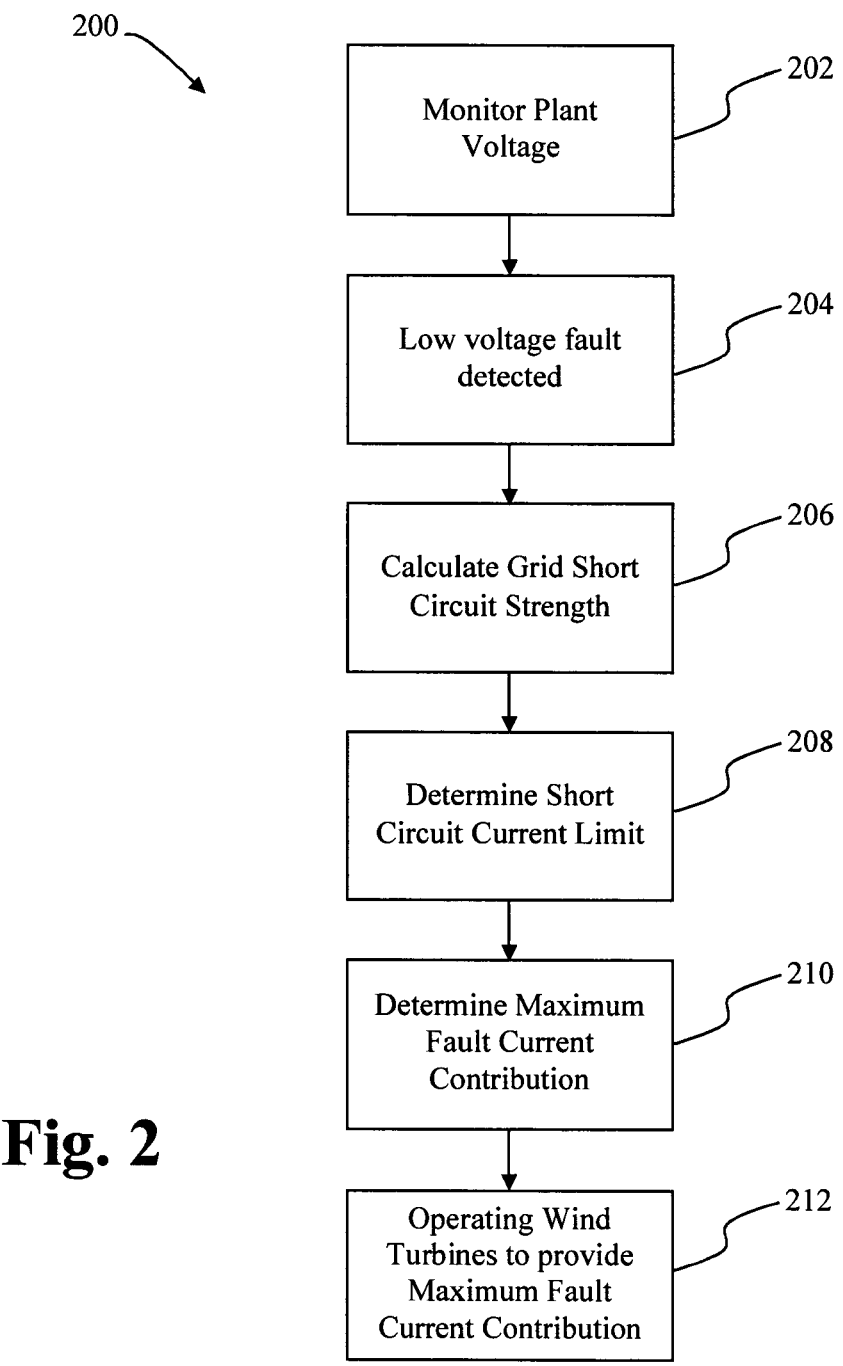
FIG. 2 illustrates a flow chart diagram setting out a method of controlling a wind turbine plant.

FIG. 2 illustrates a flow chart diagram setting out a method of controlling a wind power plant 200 according to an embodiment. At 202, the voltage of the wind turbine plant is monitored for a low voltage event, particularly at the high voltage node of the substation, i.e. the point of common coupling with the electrical grid. At 204, a low voltage event is detected, which leads on to 206, at which a grid short circuit strength is calculated. At 208, a short circuit current limit is determined, if the grid short circuit strength requires a fault current contribution which exceeds the breaking capacity of the circuit breaker. At 210, a maximum fault current contribution based on the short circuit current limit is determined. At 212, the wind turbine generators of the wind power plant are operated to provide to the electrical grid the maximum fault current contribution.

In conjunction with the above method, there is provided a wind turbine plant comprising a wind turbine plant power control system comprising: a monitoring circuit configured to detect a low voltage fault event, a short circuit strength calculation unit configured to calculate a gird short circuit strength, a determination unit configured to determine a short circuit current limit if the grid short circuit strength requires an initial fault current contribution which exceeds the breaking capacity of the circuit breaker to be passed through the circuit breaker, a fault current determination unit configured to determine a maximum fault current contribution based on the short circuit current limit, and a power controller configured to send reference signals to the wind turbine generators to provide to the electrical grid the maximum fault current contribution.

Figure 3A:
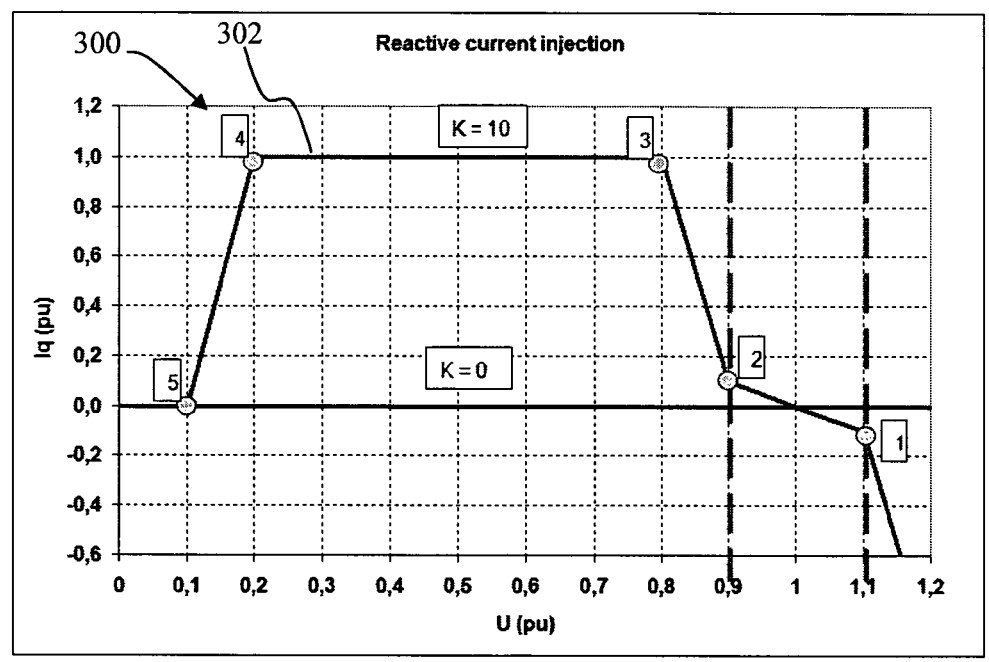
FIG. 3a illustrates a typical reactive current injection profile for low voltage electrical faults.
Figure 3B:
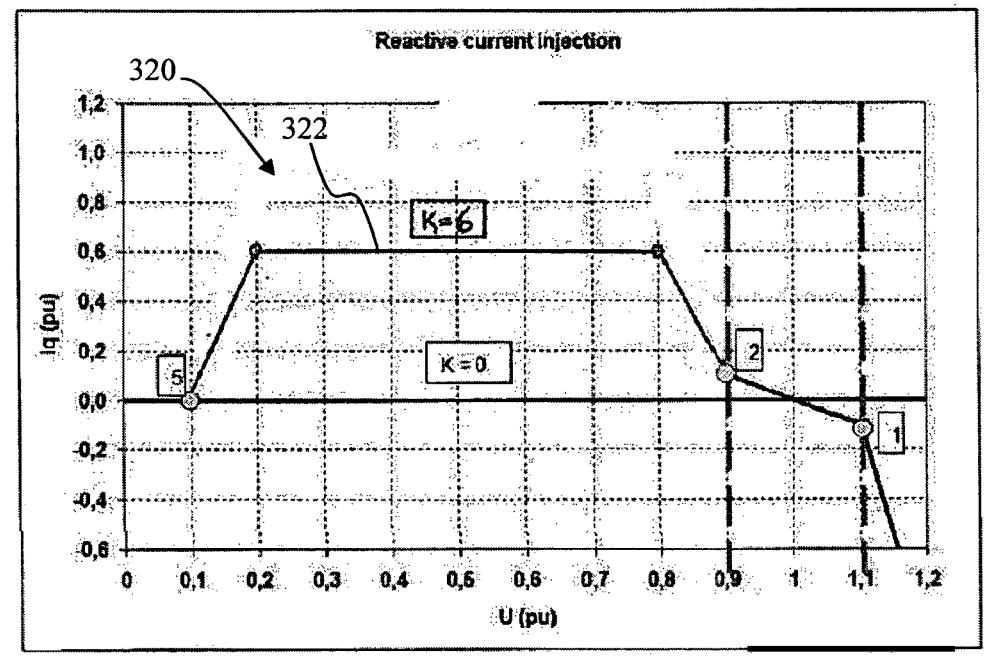
FIG. 3b illustrates a weak grid injection profile for low voltage electrical faults according to an embodiment.

In another embodiment, a different fault injection profile is used to provide the maximum fault current contribution. During a low voltage event, the individual wind turbine controller immediately switches from normal production mode to a fault ride through mode, producing reactive current according to a predetermined current injection profile. FIG. 3a illustrates a conventional reactive current injection profile 300 for low-voltage electrical faults. It may be noted that when the voltage drops to 0.8 p.u., the reactive current to be injected 302 has a gain of 10 and an output of 1.0 p.u. In this embodiment, the grid short circuit strength is tracked, and in the event the grid short circuit strength requires a fault current contribution which exceeds the breaking capacity of the circuit breaker, the turbines switch to a weak grid fault injection profile with a determined lower gain, and thus lower output, applied to the reactive current injection. The maximum fault current contribution is thus limited by and set to the output of the weak grid fault injection profile. FIG. 3b illustrates a weak grid injection profile 320 for low voltage electrical faults according to an embodiment.

The weak grid fault injection profile, and particularly the gain of the profile to determine the reactive current contribution 322, is determined iteratively. This determination is carried out on a regular basis, for example every 10 minutes (it can be less than 10 min up to 10 s, the frequency of calculation can be automated based on the previous samples rate of change of SCR at the PCC), and is based on the calculations of the grid short circuit strength, the present grid voltage, and the breaking capacities of the various circuit breakers in the plant. It may also include considering the output capabilities of the power sources in the wind turbine plant. The maximum fault current contribution is determined, and is applied to the weak grid injection profile by lowering the reactive current injection gain and output. This updated profile is then stored within the converter control system of each wind turbine, to be used with the method according to this embodiment.

In an alternative embodiment, the wind turbine plant comprises multiple types of wind turbines in the plant, and a method of operating such a plant is provided, where a reduced per-unit power reference is determined for each individual turbine, based on the short circuit current limit, as well as the power producing capability of each turbine. Further, in another embodiment, the operational status of the wind turbine is considered in determining the reduced per-unit reactive current reference. Wind turbine power converters may in some instances comprise multiple lower-rated power converters stacked in a parallel configuration. If a lower-rated power converter is faulty, it may still be possible for the wind turbine power converter to function at a reduced rating. In this embodiment, the operational status of each wind turbine power converter is considered in the determination of the corresponding maximum fault current contribution for each wind turbine generator. Other attributes of the wind turbine may also be considered, for example, the operational status of the electrical generator, in particular the generator windings and insulation as well as the electrical transformer.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method of operating a wind turbine plant comprising at least one transmission branch comprising a plurality of wind turbine generators, the transmission branch coupled to an electrical grid at a point of common coupling through at least one circuit breaker comprising a breaking capacity, the method comprising:

monitoring the wind turbine plant for a low voltage fault event; and if a low voltage fault event is detected:
calculating a grid short circuit strength,
determining a short circuit current limit if the grid short circuit strength requires an initial fault current contribution which exceeds the breaking capacity of the circuit breaker to be passed through the circuit breaker,
determining a maximum fault current contribution based on the short circuit current limit, and
operating the wind turbine generators to provide to the electrical grid the maximum fault current contribution.

2. The method according to claim 1, further comprising:
determining a corresponding maximum fault current contribution for each wind turbine generator, based on the short circuit current limit and an output capability of each wind turbine generator.

3. The method according to claim 2, wherein determining the corresponding maximum fault current contribution further comprises analyzing an operational status of the wind turbine generator.

4. The method according to claim 3, wherein determining the corresponding maximum fault current contribution further comprises analyzing an operational status of a power converter in the wind turbine generator.

5. The method according to claim 1, wherein calculating a grid short circuit strength comprises:
injecting a predetermined amount of reactive power into the electrical grid at a defined location within the wind turbine plant,
measuring a change in a voltage level of the grid, and
determining a grid short circuit strength by comparing the change in voltage level of the grid with the amount of injected reactive power.

6. The method according to claim 1, wherein the short circuit current limit is determined to be the breaking capacity of the circuit breaker.

7. The method according to claim 1, wherein determining the maximum fault current contribution comprises:
implementing the use of a weak grid fault injection profile in place of a conventional fault injection profile.

8. The method according to claim 7, wherein the weak grid fault injection profile is obtained by:
determining the maximum fault current contribution based on the grid short circuit strength, a present grid voltage and the breaking capacities of the circuit breakers in the wind turbine plant, and
lowering the reactive current injection gain in the weak grid fault injection profile, such that the output of the wind turbine plant matches the maximum fault current contribution.

9. The method according to claim 1, wherein determining the maximum fault current contribution comprises:
lowering a power reference to be provided to the wind turbine generators such that the amount of fault current to be produced by the wind turbine generators drops below the short circuit current limit.

10. The method according to claim 1 wherein the low voltage fault event is any one of an electrical grid short circuit, an electrical grid fault, and a plant transmission circuit short circuit fault.

11. A wind turbine plant comprising:
at least one transmission branch comprising a plurality of wind turbine generators, the transmission branch coupled to an electrical grid at a point of common coupling through at least one circuit breaker comprising a breaking capacity;
and a wind turbine plant power control system comprising:
a monitoring circuit configured to detect a low voltage fault event,
a short circuit strength calculation unit configured to calculate a grid short circuit strength,
a determination unit configured to determine a short circuit current limit if the grid short circuit strength requires an initial fault current contribution which exceeds the breaking capacity of the circuit breaker to be passed through the circuit breaker,
a fault current determination unit configured to determine a maximum fault current contribution based on the short circuit current limit, and
a power controller configured to send reference signals to the wind turbine generators to provide to the electrical grid the maximum fault current contribution.

12. The wind turbine plant according to claim 11, wherein the determination unit is configured to determine a corresponding maximum fault current contribution for each wind turbine generator, based on the short circuit current limit and an output capability of each wind turbine generator.

13. The wind turbine plant according to claim 11, wherein the fault current determination unit comprises a weak grid fault injection profile for use in place of a conventional fault injection profile.

14. The wind turbine plant according to claim 13, further comprising a fault injection profile determination unit configured to determine the maximum fault current contribution based on the grid short circuit strength, a present grid voltage and the breaking capacities of the circuit breakers in the wind turbine plant, and lowering the reactive current injection gain in the weak grid fault injection profile, such that the output of the wind turbine plant matches the maximum fault current contribution.

15. The wind turbine plant according to claim 13, wherein the weak grid fault injection profile is provided to and stored in a wind turbine power converter control unit for operating the wind turbine generator.

* * * * *